United States Patent Office 2,975,819
Patented Mar. 21, 1961

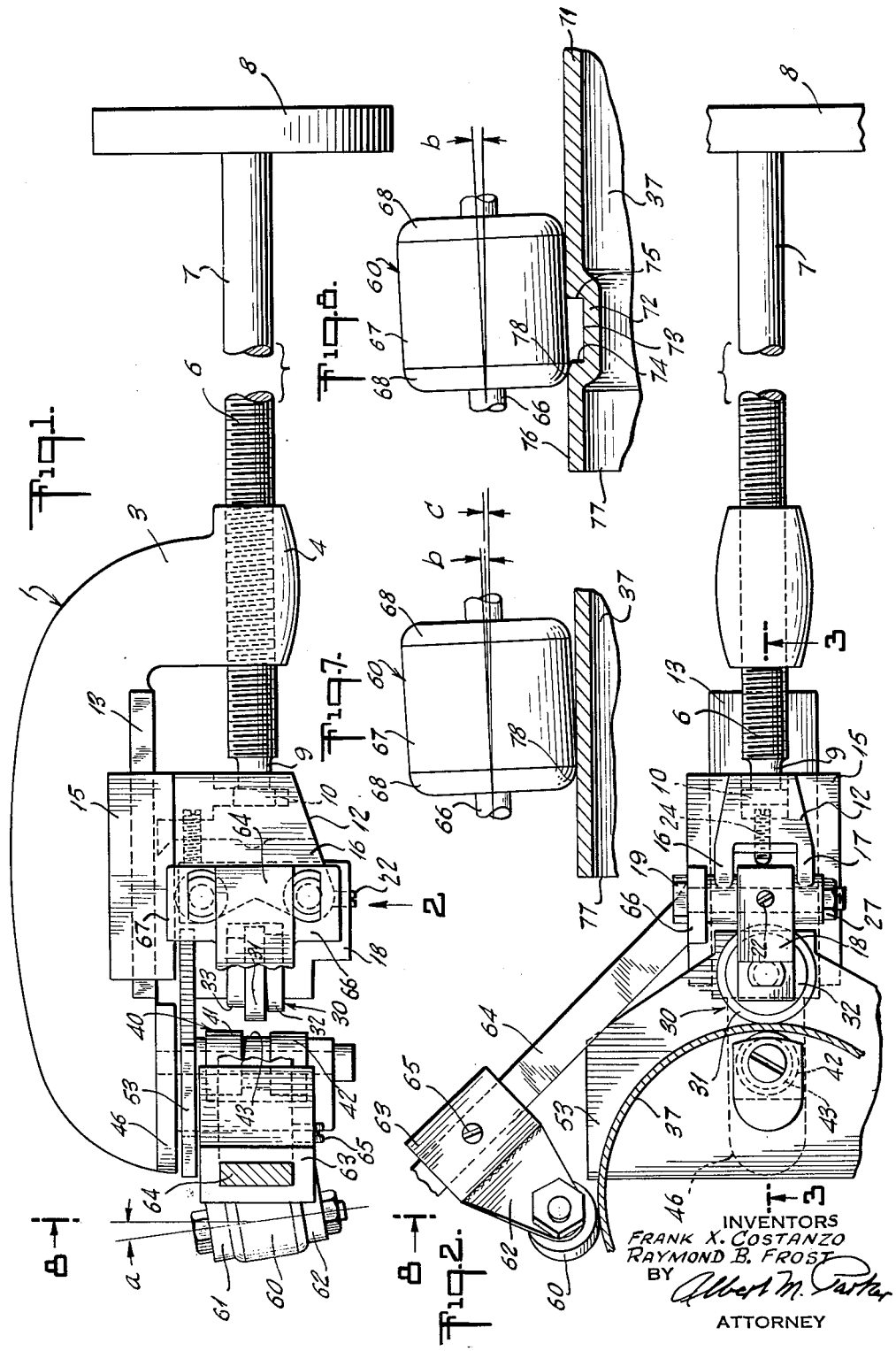

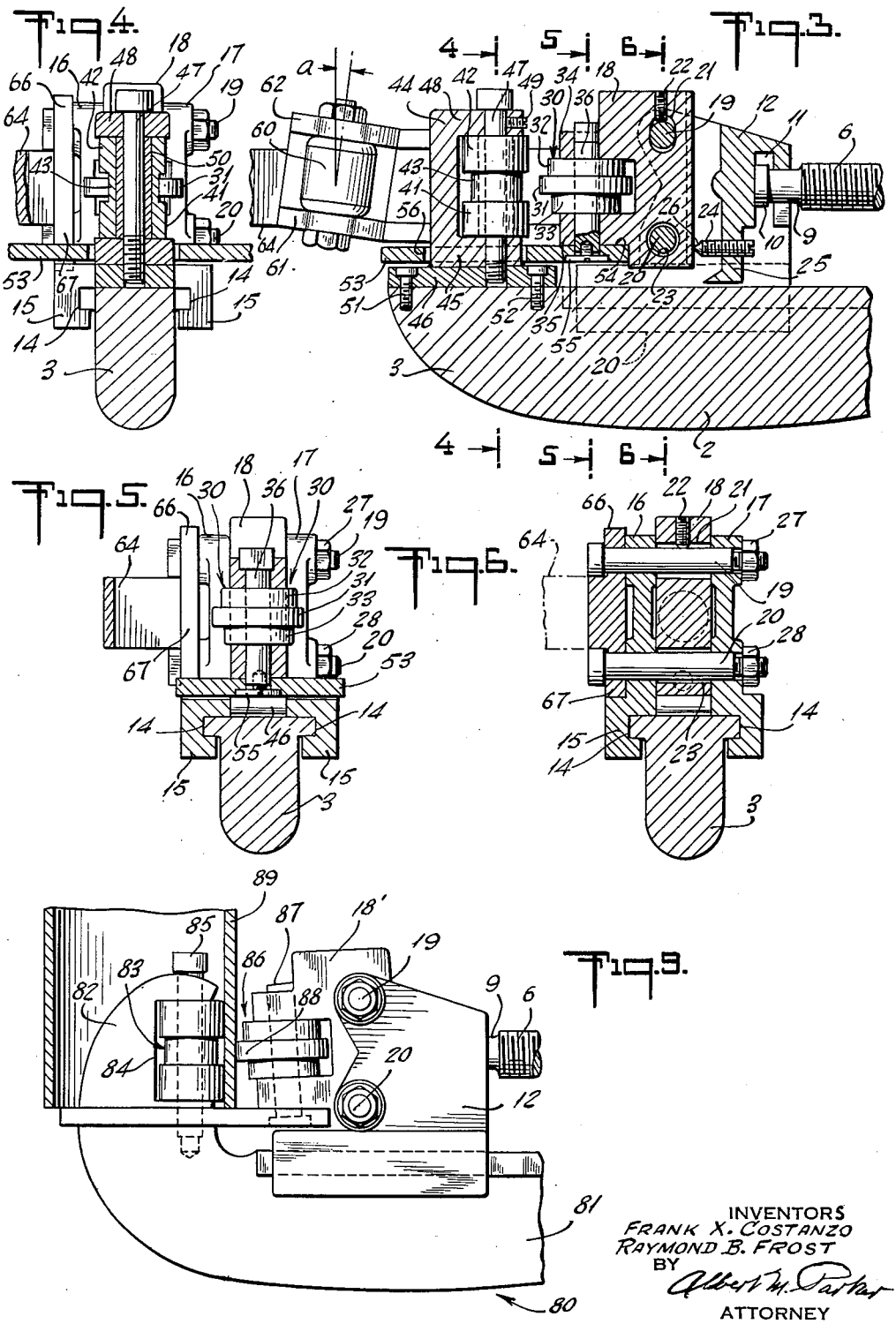

2,975,819

PIPE GROOVING TOOL

Frank X. Costanzo, Cranford, and Raymond B. Frost, Springfield, N.J., assignors to Victaulic Company of America, Union, N.J., a corporation of New Jersey Filed June 29, 1955, Ser. No. 518,754

3 Claims. (Cl. 153—9)

This invention relates to tools and methods for the forming of grooves in pipe and is particularly concerned with such tool and method for the rolling of coupling engaging grooves in thin walled straight end pipe or tubes, adjacent the ends thereof.

Heretofore the use of thin walled metallic conduits for the transporting of fluids has been limited by the difficulties and expense involved in joining lengths of such conduit together. Such use was generally limited to small sized conduit for special purposes and permanent installations, where the expense of coupling the sections together by means of welded, soldered or brazed fittings was warranted. When, however, it came to the joining of pipes in the larger sizes having thin walls of steel, aluminum or copper, the forming of effective joints with any degree of economy was out of the question. Hence, conduit formed of materials and of a thickness best suited for use in the rapid laying of pipe lines whether temporary or permanent was put aside.

The instant invention, however, reverses all of this and enables the end joining of thin walled pipes or tubes in a most simple and economical manner. Furthermore, it enables the joining of such pipe ends quickly with joints which will prevent pipe end separation and resist leakage under internal pressures above the bursting strength of the conduits themselves. It does so by the provision of a method and simple economical tool which can be employed in simple, fool-proof manner by unskilled workmen while keeping the physical effort involved down to a minimum.

It is, accordingly, an object of this invention to provide a method for the rolling of coupling engaging grooves in thin walled tubular elements.

Another object is to provide a tool for forming such grooves.

Still another object is to provide such a tool which is simple and economical in construction and can be operated effectively without involving any particular skill.

A further object is to provide such a tool which operates uniformly to exactly duplicate the grooving applied to a large number of conduits.

A still further object is to provide such a tool which can be effectively employed with a minimum of physical effort and whose mode of operation readily suggests itself to the workman.

A more detailed object is to provide such a tool which locates and maintains itself in proper grooving position as it is operated.

Further and more detailed objects will in part be obvious and in part be pointed out as the description of the invention taken in conjunction with the accompanying drawing proceeds.

In that drawing:

Fig. 1 is an elevation of the tool of the invention with small portions broken away to enable parts behind them to be seen.

Fig. 2 is a bottom plan view of a tool in accordance with the invention shown as applied to a section of conduit for the grooving of the same.

Fig. 3 is a fragmentary vertical section of the tool of the invention taken on lines 3—3 of Fig. 2 and looking in the direction of the arrows, with the section of conduit omitted and the rollers and threaded actuating screw being shown in elevation.

Figs. 4, 5 and 6 are vertical sections taken respectively on lines 4—4, 5—5 and 6—6 of Fig. 3 and looking in the direction of the arrow in each instance.

Fig. 7 is an enlarged fragmentary elevational view of the stabilizing roller per se applied to a section of pipe at the angle such roller takes with respect to the pipe surface as the tool is initially applied to the pipe at the commencement of the grooving operation.

Fig. 8 is a view of the same parts in the relative position they achieve as the grooving proceeds; and Fig. 9 is a fragmentary elevational view of a slightly modified form of tool in accordance with the invention.

Though the method and tool of the instant invention, as shown in the accompanying drawing and to be described hereinafter, are particularly applicable for the forming of coupling housings in pipes and tubes of thin wall section, it is of course to be understood that the tool and method may also be employed in the roller grooving of pipes of normal wall thickness, rather than those of thinner section normally characterized as "tubes." Hence, though the elements to be grooved using the tool and following the method of the invention will be referred to hereinafter as "tubes" it is to be understood that such is for emphasis and for illustrative purposes and the invention is by no means to be considered as being limited thereby.

The base member 1 of the tool of the invention is generally L-shaped, the leg of the L forming a base portion 2 and with the foot 3 of the L terminating in an enlarged hub 4. The hub 4 is provided with a threaded bore 5 extending generally parallel to the base portion 2 for the reception of the screw threaded portion 6 of the actuating member 7. The member 7 has an operating handle 8 at its outer end and has reduced shank 9 adjacent its inner end terminating in an enlarged head 10.

The head 10 is suitably received in a slot 11, see Fig. 3, formed in the slide block 12 for the actuation of that slide block back and forth on the slide 13 provided on the upper surface of the base portion 2. The guide block receives the slide in guide-ways 14 formed in the opposed extensions 15. The slide 13 is parallel to the axis of the screw 6, which thus serves to slide the block 12 back and forth as desired.

Referring now to Figs. 2 and 3, it will be seen that the side of the slide block 12 opposite to that engaged by the end 10 of the screw 6 projects in a pair of spaced horns 16 and 17 for the reception of the grooving roller mounting member 18 therebetween. This member is secured between the horns by means of a pair of bolts 19 and 20 which are seated in fitted bores in the horns and pass through enlarged bores into the member. The upper of these bores 21 in the mounting member has the same width as the shank of the bolt, but, as seen in Figs. 3 and 6, is elongated vertically. This enables an initial exact vertical setting to be made of the block with respect to the horns, by means of the set screw 22 which passes through the upper portion of the member 18 into engagement with the shank of the upper bolt 19.

The lower bore 23 in the member 18 is cylindrical but is enlarged with respect to the circumference of the bolt 20. This enables the member 18 to be swung a small distance about the upper bolt 19, and to have its position determined by the position of the set screw 24. This set screw is threadedly received in an extension 25 of the slide block 12 and engages the end surface of the member 18 at 26. By means of these two adjustments, the mounting member 18 can be accurately positioned both vertically and angularly within the horns 16 and 17 prior to being clamped in place by tightening the nuts 27 and 28 carried by the bolts 19 and 20. As these nuts are tightened up they draw the horns 16 and 17 into tight clamping engagement against the sides of the member 18 and secure it in position.

This precise positioning of the member 18 is for the purpose of accurately positioning the grooving roller, generally indicated at 30, with respect to the tube to be grooved. This grooving roller 30 has a center grooving portion 31 bordered on either side by roll portions 32 and 33 of smaller diameter. Besides being coaxial with the grooving portion 31 and being of a smaller diameter, the diameters of the roller portions 32 and 33 differ from each other. The purpose of this is to prevent roller engagement with the portion of the pipe outwardly of the groove with any means which might disturb its outer surface and reduce the effectiveness of seating of the gasket thereon. Thus, the portion 32 engages the pipe inwardly of the groove and serves as the stop to determine the depth of the groove created by the grooving portion 31. The outer roller portion 33, however, is of sufficiently smaller diameter than that of the portion 32 so that it does not quite touch the surface of the pipe or tube. The difference in diameter between the roll portions 32 and 33 would normally be in the order of approximately $\frac{1}{16}$ of an inch. The portion 32 then serves principally to balance off the portion 33 and serves as a spacer to maintain the grooving portion 31 in its proper longitudinal position.

The grooving roller 30 is mounted in a slot extending transversely into the body of the mounting member 18 between extensions 34 and 35 thereof. This mounting is by means of a pin 36 suitably received in the bores in the extensions 34 and 35, as well as in an axial bore extending through the roller 30. The pin and the roller 30 are made of hardened material to reduce wear and fit together for free rotation of the roller without play.

As seen from the Fig. 2, the roller 30 engages the exterior of a tube, here shown at 37, which is to be grooved from the exterior surface inwardly. To form a proper groove with straight side walls, particularly the side wall at the side of the groove towards the end of the tube, calls for the grooving roller cooperating with a backup roller, generally indicated at 40, positioned inside the tube in opposition to the grooving roller. This backup roller as here shown is located on an axis parallel to the axis of the grooving roller 30 and is formed with coaxial enlarged end portions 41 and 42 of equal diameter with an intermediate portion 43 therebetween of reduced diameter from that of the portions 41 and 42. Thus, the backup roller has an intermediate recess of width and depth to enable the material of the tube being grooved to flow thereinto under the action of the grooving roller portion 31 to form a groove of desired depth and width.

Preferably, the width of the portion 43 needs to be equal to the width of the grooving roller portion 31, plus twice the thickness of the tube material. Then, if the depth of the groove is substantially equal to or slightly greater than the wall thickness of the tube the groove may be formed without appreciable thinning down of the material. Such groove will still provide abrupt side walls for effective engagement with the key section of the coupling housing. Obviously, the portions 41 and 42 of the backup roller will engage the interior of the tube at the outset, assisting in maintaining it undisturbed and will cooperate with the stop roll portion 32 as it comes into action to restrict the depth of the groove to the extent required.

The backup roller 40 is mounted between the arms of a C-shaped housing 44, whose lower arm 45 is suitably secured, as by welding or otherwise, to a mounting plate 46 to be hereinafter described. A hardened pin 47 extends through the upper arm 48 of the housing, through the backup roller 40 and through the lower arm 45 and secures the roller in place. The pin 47 is itself threadedly secured in the plate 46. Loosening of the pin 47 during use is precluded by the action of a set screw 49 seated in the arm 48 and engaged with the shank of the pin. The backup roller 40, like the pin 47, is made of hardened material and may be mounted for rotation directly on the pin 47 or may be mounted thereon by means of an intermediate bushing 50, as shown in Fig. 4. In any event, the roller 40 should be mounted to freely rotate on the pin 47 without play or endwise movement.

The mounting plate 46, carrying the housing 44 is suitably secured to the foot 3 of the base member 1 by means such as the bolts 51 and 52. A stop plate 53 overlies the mounting plate 46 and is substantially enlarged laterally with respect to the plate 46 and to the foot 3, as best shown in Fig. 2. This plate 53 is engaged by the end of a tube located in the tool and serves to accurately locate the tube so that the groove will be formed at the same distance from the end of the tube in every instance. This plate 53 is secured at its inner end in a recess 54, formed therefor in the member 18 by means of a cap screw 55 which screws into the lower end of the pin 30, as seen in Figs. 3 and 5. The plate 53 is recessed at 56 to fit over the housing 44. The plate 53 as seen in Figs. 1, 4 and 5 lies in a transverse plane extending at a right angle with respect to the axis of the backup roller 40.

To facilitate operation of the tool in several respects and prevent creasing of the tube 37, the tool is provided with a stabilizing roller, generally indicated at 60, which is formed and mounted to ride on the exterior of the tube at a substantial angle around the circumference thereof from the position of actuation of the grooving roller 30. This roller 60 is mounted between the extending arms 61 and 62 of a bracket 63, the base of which is slidably mounted on a supporting arm 64 and may be fixedly positioned thereon by means of a set screw 65. The inner end of the arm 64 is widened laterally into wings 66 and 67 which fit the contour of the outer side of the horn 16 and are secured thereto by means of the bolts 19 and 20. This mounts the arm 64 rigidly on the slide block 12.

As here shown the arm 64 extends at right angles to the axes of the grooving and backup rollers. The end of the arm 64 is here shown as broken away but it is to be understood that such arm would be long enough to enable the tool to be used for the forming of grooves in tubes of substantial diameter, as well as in tubes of normal pipe sizes. Further, it is to be understood that though the bracket 63 is slidable on the arm 64, the fit of the two is such as to eliminate any play, and the set screw 65 serves to hold the bracket in the exact position in which it is placed.

The formation and mounting of the stabilizing roller 60 are of considerable significance, for this roller performs several functions. First, since the tool is operated by turning the handle portion in counter clockwise direction, as viewed in Fig. 2, it will be apparent that the roller 60 engaging the outer surface of the pipe serves to maintain the backup roll and grooving roller in proper opposed relation on a radius of the pipe. This prevents the grooving roller turning about the axis of the backup roller to crease the pipe and jam the tool. Further, however, the stabilizing roller serves to cause the tool to travel inward on the tube and bring the plate 53 against the free end of the tube. It does all this without distorting the outer side wall of the groove and without distorting or marring the surface of that portion of the tube between the groove and the end thereof coming into contact with the gasket.

For full effectiveness, the roller 60 should be mounted on its bracket 63 with its axis extending at angles with respect to the axis of the tube in two different planes. Looking at it another way, the axis of the roller 60 is angled in two directions with respect to the axes of either of the rollers 30 and 40. At the same time it lies substantially in a plane parallel to the plane extending through the axes of the rollers 30 and 40. One of these angles is illustrated at "a" in Figs. 1 and 3, and as being of approximately 8°. This angle in this direction gives highly effective results. Results of reasonable effectiveness can, however, be achieved by an angularity varying therefrom in several degrees in either direction, so the invention is not to be considered as limited to the precise angle of 8°.

The angularity of the roller in this direction, as seen, locates the roller in a path leading inwardly on the tube. Hence, when the tool is rotated counterclockwise about the tube, as viewed in Fig. 2 the roller tends to follow an inwardly extending helical path. This maintains the tool inwardly on the tube against the end stop plate 53. It has been found desirable to add to the effectiveness of this action by imparting a particular surface formation to the roller and to tilt the axis of the roller upwardly at a slight angle "b" with respect to the surface of the tube. This upward tilt of the roller is in a direction away from the end stop plate 53. Considering it in reverse the axis of the roller 60 is inclined slightly inwardly toward the stop plate 53. This causes the leading edge of the roller 60, at 78, to bear on the work during the grooving operation. Here, the angle is quite small, being approximately 2° so falls within the foregoing language of lying substantially in a plane parallel to the plane extending through the axes of the rollers 30 and 40.

These angularities of "a" and "b" are provided by the formation of the bracket 63, to impart the desired angularities to the roller shaft 66, so that the roll 60 concentric with it will extend likewise.

Considering the size and surfacing of the roller 60, a roller in the form of a right circular cylinder, being substantially twice as long as the width of the groove to be formed, has been found to operate effectively. Its end corners are rounded off on a small radius 68. Only one of these rounded ends is used at a time. Economically, however, the rollers are made with such radii at both ends, so that they can be reversed when one end becomes worn.

The manner in which the roller 60 acts with respect to the exterior surface of the tube being grooved is best seen from Figs. 7 and 8. Here a section of the tube 37 is shown in Fig. 7, with the tool initially applied thereto and prior to any turning of it to commence the formation of a groove. In Fig. 8, the completed groove is shown. Referring to Fig. 8 it will be noted that the material 71 of the tube wall substantially maintains its original thickness throughout the cross section of the groove, as seen at 72. Also, the groove is seen to have a flat bottom 73 with straight side wall portions 74 and 75 extending upwardly therefrom at right angles. This groove receives one of what are commonly referred to as the "key sections" of the coupling housing. These key sections serve, through the coupling body to hold the sections of the pipe or tube in proper aligned relation. Thus, the groove should fit the key section without play with the side wall surface 74 of the groove being of particular significance.

The surface 74 provides the area against which the pull is exerted when pressure in the tube tends to separate the coupled tube sections. It thus must be at right angles to the axis of the tube and have sufficient engagement with the key section to prevent the key section from pulling out of the groove. Hence, the stabilizing roller 60, though running over the path of the grooving roller 30, should not, however, materially disturb the extent or contour of the surface 74 being formed by the grooving roller. Further, as already pointed out, the stabilizing roller should leave the major portion of the surface 76 unmarred for effective gasket engagement. However, the stabilizing roller 60 is relied upon to provide the tracking effect needed to position and maintain the tool on the tube with its stop plate in engagement with the end of the tube. All of these factors are taken into account in the formation and mounting of the stabilizing roll 60.

When the tool is first seated on the tube with its rollers 30 and 40 brought against the outer and inner surfaces by manipulation of the screw 7, the axes of the rollers 30 and 40 will be parallel to the tube axis. Thus, the stabilizing roller 60, as illustrated in Fig. 7, will be at its set angle "b" of approximately 2° with respect to the surface of the tube. When rotation of the tool is commenced, however, the tracking or helix effect of the roller 60 produces sufficient friction between the exterior of the pipe and the grooving roller to cock or tilt the whole tool to the extent indicated by the difference between the angles "b" and "c" in Fig. 7. Thus, momentarily the stabilizing roll tends to bring its surface 67 into parallelism with the outer surface 76 of the tube. This position is maintained for the short period required for the tracking action of the stabilizing roller to bring the end 77 of the tube against the stop plate 53 and for the grooving to commence. Once that grooving has proceeded to a moderate extent, the seating of the grooving roller portion 31 in the groove locates the tool in position on the pipe and reduces the necessity of the tracking action of the stabilizing roller. Thus, the tilt of the tool is eliminated and the angle "b" of the stabilizing roller is restored and remains that way during the completion of the groove as illustrated in Fig. 8.

To briefly restate the operation of the preferred form of the invention as just described, the tool with the screw 6 backed off sufficiently for the reception of the end of a piece of pipe or tube, as shown at 37 in Fig. 1, between the grooving roller 30 and the backup roller 40 is mounted on the tube so that its end 77 engages the stop plate 53. Then, the screw 6 is turned up until the grooving portion 31 of the grooving roller engages the exterior of the tube so as to hold it against the backup surfaces 41 and 42. If necessary, the bracket 63 will be slid along the support 64 until the stabilizing roller 60 engages the exterior of the tube and the set screw 65 will be retightened. Assuming that the tube is being held while the tool is rotated, the rotation of it is commenced in the counter clockwise direction, as viewed in Fig. 2. The tool is normally slid onto the tube until the plate 53 engages the end of the tube though that is not necessary, since the tracking effect of the roller 60 would cause the tool and tube to adopt that position.

At the outset, while the grooving gets well under way, the tool will be slightly tilted outwardly, as already pointed out. As the grooving proceeds, the effect of that tilt will be eliminated.

While the tool is rotated about the pipe, the handle 8 is turned to feed the grooving roller 30 inward at a speed indicated by the weight and type of material being grooved. This continues until the stop roll portion 32 comes up against the body of the tube where it is backed up by the backup roll portion 42. Then the screw 6 is backed off and the tool is removed from the tube. Alternately, it is of course understood that the tool can be held stationary once it is set on the pipe or tube and the tube can be rotated with respect to the tool. With light weight tube material, however, it is generally preferable to hold the tube stationary and rotate the tool.

In the alternate showing of Fig. 9, the mounting member, generally indicated at 80, has a base portion 81 and an integral end portion 82 carrying the backup roller 83 in the slot 84 therein by means of the hardened pin 85. The slide block 12 is the same as that of the previous figures and the only difference in the block 18' over the block 18 is that its lower bore, receiving the bolt 20, is set inward with respect to the bore receiving the bolt 19, to mount the block 18' on slide block 12 at somewhat of an incline. Thus, the grooving roller 86, rather than being on an axis parallel to that of the backup roller 83, is on an axis inclined toward that of the backup roller, as viewed in Fig. 9 whereby the axes of the two rollers converge to a point in front of the stop plate 53. In other respects the pin 87, carrying the grooving roller is the same as the pin 36. Here, it will be apparent that the grooving section 88 of the grooving roller will tend to work its way into the material 89 of the pipe or tube at somewhat of an incline. The angle here is exaggerated so that in actual practice the incline is hardly noticeable and to the extent it exists makes for a more effective shoulder on the side of the groove toward the free end of the tube. The incline, however, does have the effect of causing the grooving roller to do its own tracking. This tracking effect can be used in place of, or in addition to, that of the stabilizing roller 60 which would be employed here the same as in the preferred form of the invention.

Though in the foregoing description and accompanying drawing, specific structure embodying the invention have been shown and described, it is of course to be understood that such showings are for illustrative and not limiting purpose and that alternatives and variations thereof as suggest themselves to those skilled in the art could be employed without departing from the spirit and scope of the invention.

Speaking more generally, since certain changes in carrying out the above method and in the constructions set forth, which embody the invention, may be made without departing from its scope, it is intended that all matter contained in the above description or shown in the accompanying drawing shall be interpreted as illustrative and not in a limiting sense.

Having described our invention, what we claim as new and desire to secure by Letters Patent is:

1. A pipe grooving tool comprising a base member, a mounting member slidably mounted on said base member, a grooving roller carried by said mounting member, a backup roller mounted on said base member on an axis parallel to the axis of said grooving roller, said axes lying in a single plane, a stop plate carried by said base member and extending transversely with respect to said axes, a support carried by said mounting member and extending away from said grooving roller, and a stabilizing roller carried by said support in laterally spaced relationship with respect to said grooving roller, the axis of said stabilizing roller lying substantially in a plane parallel to the plane extending through the axes of said grooving and backup rollers, said axis of said stabilizing roller being angled in two different directions with respect to the axes of said grooving and backup rollers, one of said angles causing said stabilizing roller to tend to follow a helical path away from said stop plate, and the other of said angles causing the leading edge of said stabilizing roller to bear on the work during the grooving operation.

2. A pipe grooving tool as in claim 1 and including said grooving roller having an intermediate portion of one diameter bordered by portions of smaller diameter, one of said smaller diametered portions on the side of said grooving portion towards said stop plate having a shorter diameter than the other of smaller diametered portions.

3. A pipe grooving tool comprising a base member, a mounting member slidably mounted on said base member, a grooving roller carried by said mounting member, a backup roller mounted on said base member, a stop plate carried by said base member and extending transversely with respect to the axis of said backup roller, the axes of said grooving roller and said backup roller lying in a single plane and said axes converging to a point in front of said stop plate, a support carried said mounting member and extending away from said grooving roller, and a stabilizing roller carried by said support in laterally spaced relationship with respect to said grooving roller, the axis of said stabilizing roller lying susbtantially in a plane parallel to the plane extending through the axes of said grooving and backup rollers, said axis of said stabilizing roller being angled in two different directions with respect to the axes of said grooving and backup rollers, one of said angles causing said stabilizing roller to tend to follow a helical path away from said stop plate, and the other of said angles causing the leading edge of said stabilizing roller to bear on the work during the grooving operation.

References Cited in the file of this patent

UNITED STATES PATENTS

| 88,411 | Raymond | Mar. 30, 1869 |
| 909,182 | Hart | Jan. 12, 1909 |
| 1,804,815 | Schultis | May 12, 1931 |
| 1,810,342 | Bulger | June 16, 1931 |
| 1,887,434 | Sammis | Nov. 8, 1932 |
| 2,016,735 | Abramson et al. | Oct. 8, 1935 |
| 2,067,436 | Coberly | Jan. 12, 1937 |
| 2,085,710 | Tornblom et al. | June 29, 1937 |
| 2,774,247 | Knost | Dec. 18, 1956 |

FOREIGN PATENTS

| 492,243 | France | Mar. 11, 1919 |